(12) United States Patent
Cardinell et al.

(10) Patent No.: US 7,475,291 B2
(45) Date of Patent: Jan. 6, 2009

(54) APPARATUS AND METHOD TO GENERATE AND SAVE RUN TIME DATA

(75) Inventors: Charles Scott Cardinell, Tucson, AZ (US); Roger G. Hathorn, Tucson, AZ (US); Man Wah Ma, Pleasanton, CA (US); Kimberly A. Thomas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 11/097,532

(22) Filed: Mar. 31, 2005

(65) Prior Publication Data
US 2006/0224928 A1 Oct. 5, 2006

(51) Int. Cl.
G06F 11/00 (2006.01)
(52) U.S. Cl. .............................. 714/45; 714/30; 717/128
(58) Field of Classification Search .................... 714/30, 714/45; 717/128
See application file for complete search history.

(56) References Cited

U.S. PATENT DOCUMENTS

| | | | | |
|---|---|---|---|---|
| 5,734,924 A * | 3/1998 | Cheng et al. | ................... | 710/4 |
| 6,154,857 A * | 11/2000 | Mann | ........................... | 714/30 |
| 7,003,699 B2 * | 2/2006 | Swaine et al. | .................. | 714/30 |
| 7,149,926 B2 * | 12/2006 | Ahmad et al. | .................. | 714/30 |
| 2003/0018929 A1 * | 1/2003 | Bardsley et al. | ............... | 714/39 |
| 2003/0145255 A1 * | 7/2003 | Harty et al. | .................... | 714/48 |

* cited by examiner

Primary Examiner—Robert Beausoliel
Assistant Examiner—Philip Guyton
(74) Attorney, Agent, or Firm—Dale F. Regelman; Quarles & Brady LLP

(57) ABSTRACT

A method is disclosed to generate and save run time data. The method supplies an embedded device comprising a processor which includes a processor cache, memory, a hardware trace facility comprising a plurality of data buffers, where the embedded device is capable of communicating with one or more host adapter ports. The method generates a trace entry, stores that trace data entry in the processor cache, and then writes the trace data entry to the plurality of data buffers.

11 Claims, 6 Drawing Sheets

FIG. 4

| BYTE:(HEX) | 0 1 2 3 | 4 5 6 7 | 8 9 A B |
|---|---|---|---|
| CONTENT | 5A 0L NN A5 | TBU TBU PP PP | TBL |

KEY:

5A - START OF SEARCHABLE PATTERN. USED TO FIND THE BEGINNING OF A TRACE ENTRY.

L - LENGTH OF THE TRACE ENTRY.

NN - COMPONENT ID

A5 - END OF SEARCHABLE PATTERN

TBU - TIME BASE UPPER

PP PP - EVENT ID

TBL - TIME BASE LOWER

```
struct OsTraceHeaderName {
    int reserved;        /*First 4 bytes reserved for HAMER.       */
    int nextEntryAddr;   /* Address of next entry to be written.   */
    int bufferStartAddr; /* Address of first trace entry.    */
    int bufferEndAddr;   /* Address of end of buffer (for wrap check).*/
    int bufferLength;    /* Size in bytes of this trace buffer.    */
    int traceWrap;       /* Indication that trace buffer has wrapped. */
    int HAMERTraceFacAddr; /* HAMER hardware Trace Facility Address. */
    int reserved1;
}
```

US 7,475,291 B2

APPARATUS AND METHOD TO GENERATE AND SAVE RUN TIME DATA

FIELD OF THE INVENTION

This invention relates to an apparatus and method to generate and save run time data.

BACKGROUND OF THE INVENTION

Embedded systems comprise special purposes systems requiring high performance but having relatively few dedicated resources. For example, embedded devices typically comprise relatively little memory, a low performance processor, few if any standard utilities, and no hard disks.

In addition, embedded devices typically do not comprise a conventional operating system. A conventional operating system is written for flexibility. An embedded system, however, performs a single purpose. Therefore, such an embedded device operates using a device microcode written to optimize the device's single function.

In order to monitor the performance of an embedded device, the device microcode includes instructions for logging trace data. In the event of a device error, that logged trace data can be analyzed to determine the cause of the error. Periodically during the operation of the embedded device, a trace statement is issued which causes, inter alia, the parameters the device is executing on at that point in time to be written to a memory device.

If an error is detected, the trace data is downloaded, and is used to determine the source of the error. What is needed is a method to form and save such trace which involves minimal usage of embedded device resources. Applicants' apparatus and method generates and saves trace data while requiring minimal device resources, and such that the trace data can be retrieved even if the embedded device resets.

SUMMARY OF THE INVENTION

Applicants' invention includes an apparatus and method to capture run time data. The method supplies an embedded device comprising a processor which includes a processor cache, memory, a hardware trace facility comprising a plurality of data buffers, a first bus interconnecting the hardware trace facility and the memory, and a second bus interconnecting the processor and the hardware trace facility, where the embedded device is capable of communicating with one or more host adapter ports. The method generates trace data by the processor, without interrupting the first bus or the second bus, stores that trace data in the processor cache, without interrupting said first bus or said second bus, and writes the trace data to the plurality of data buffers comprising a plurality of FIFOs, without interrupting said first bus.

BRIEF DESCRIPTION OF THE DRAWINGS

The invention will be better understood from a reading of the following detailed description taken in conjunction with the drawings in which like reference designators are used to designate like elements, and in which:

FIG. 4 shows the format for each trace entry generated by Applicants' apparatus and method; FIG. 5B shows the format of Applicants' traceHeader.

DETAILED DESCRIPTION OF THE PREFERRED EMBODIMENTS

This invention is described in preferred embodiments in the following description with reference to the Figures, in which like numbers represent the same or similar elements. Applicants' method to generate and save run time data is described herein in embodiments which include an information storage and retrieval system which comprises two clusters, two processors, and a plurality of information storage media. The following description of Applicant's method to generate and save run time data is not meant, however, to limit Applicant's invention to data processing applications, as the invention herein can be applied generally to generating and saving trace data in an embedded device.

Figure 1:
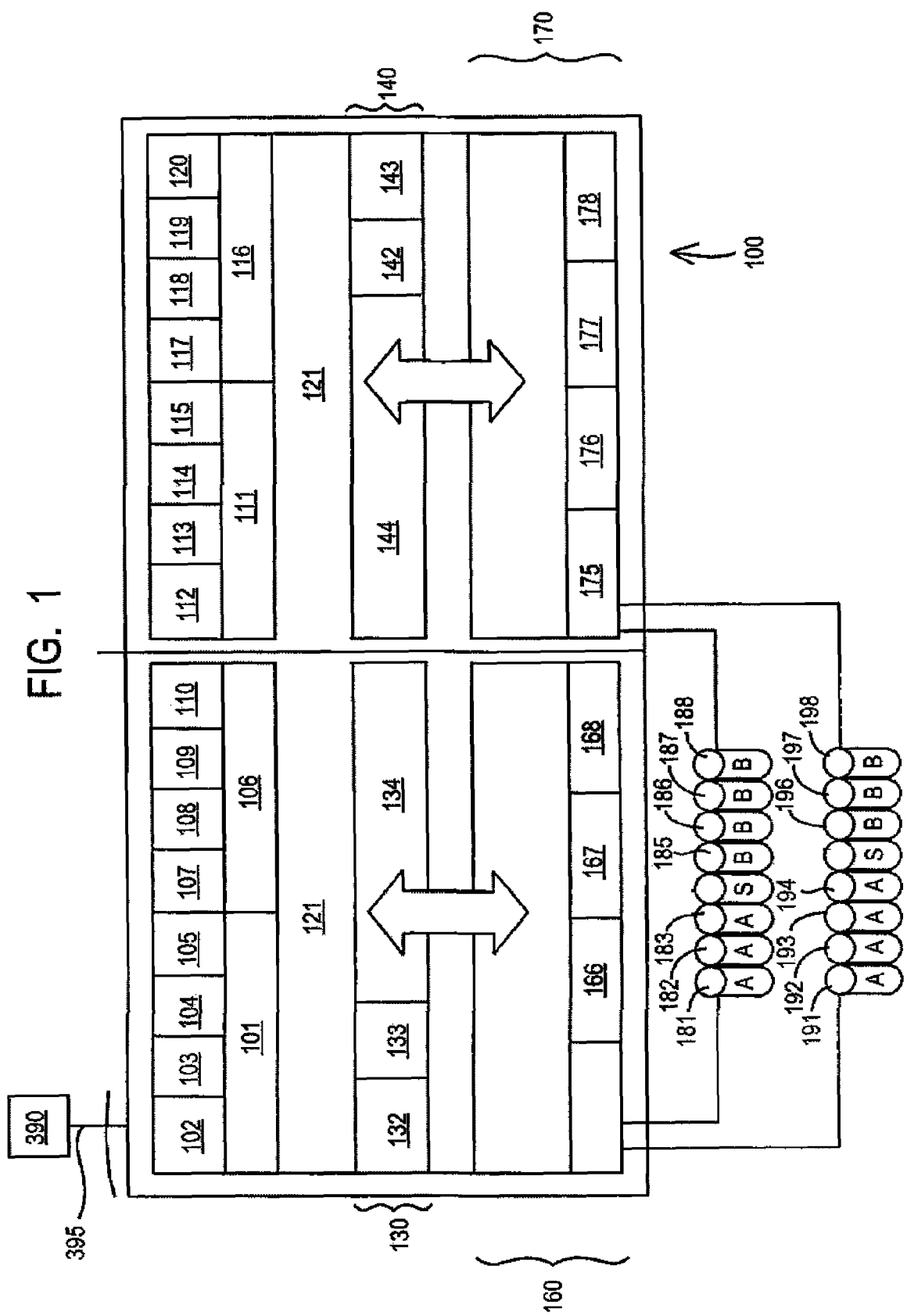
FIG. 1 is a block diagram showing one embodiment of Applicants' information storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a plurality of host adapters 102-105, 107-110, 112-115, and 117-120, disposed in four host bays 101, 106, 111, and 116. In other embodiments, Applicants' information storage and retrieval system includes fewer, or more, than 16 host adapters. Regardless of the number of host adapters disposed in any embodiments of Applicants' system, each of those host adapters comprises a shared resource that has equal access to both central processing/cache elements 130 and 140. Each host adapter may comprise one or more Fiber Channel ports, one or more FICON ports, one or more ESCON ports, or one or more SCSI ports. Each host adapter is connected to both clusters through interconnect bus 121 such that each cluster can handle I/O from any host adapter.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, processor portion 130, and one or more device adapters, are packaged together on a single card disposed in Applicants' information storage and retrieval system. Similarly, in certain embodiments, one or more host adapters, processor portion 160, and one or more device adapters, are disposed on another card disposed in Applicants' information storage and retrieval system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicants' system includes a single storage device array. In yet other embodiments, Applicants' system includes more than two storage device arrays.

Figure 2:
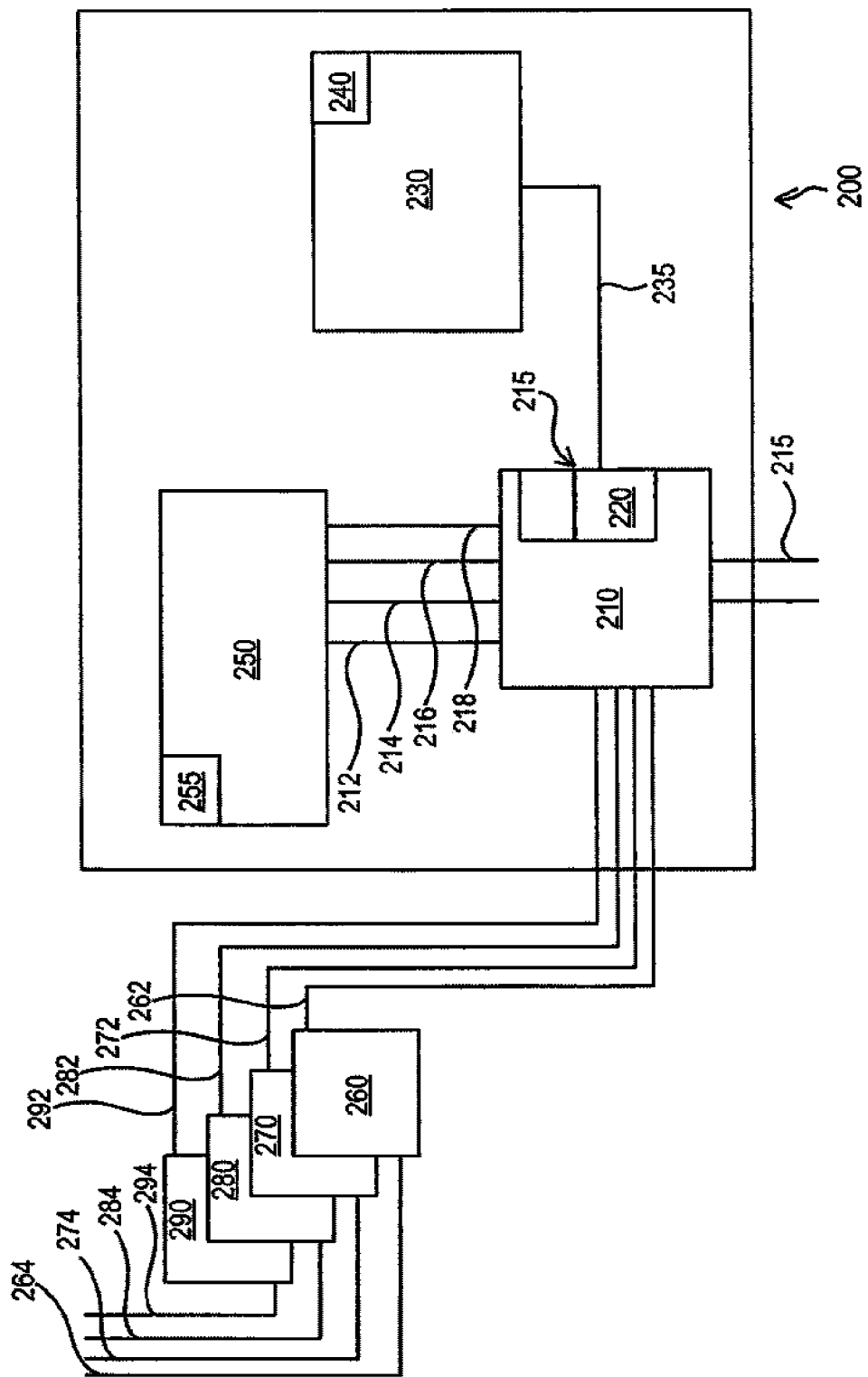
FIG. 2 is a block diagram showing Applicants' embedded device.

FIG. 2 shows a block diagram of one embodiment of Applicants' embedded device 200. In certain embodiments, embedded device 200 comprises a host adapter card. Referring now to FIG. 2, embedded device 200 includes control chip 210, processor 230, and memory 250. Processor 230 data cache 240, and memory 250 includes microcode 255. In the illustrated embodiment of FIG. 2, control chip 210 communicates with memory 250 via a first bus which includes communication links 212, 214, 216, and 218. Control chip 210 communicates with processor 230 via a second bus which includes communication link 235. Control chip 210 communicates with one or more system processors, such as for example processor 132 (FIG. 1) and/or processor 142 (FIG. 1)

Control chip 210 includes trace data storage facility 215 which includes a plurality of data buffers 220. In certain embodiments, data storage facility 215 comprises a hardware trace facility comprising a Hardware Assisted Microcode Event Recording ("HAMER") facility which includes the plurality of data buffers 220. In certain embodiments, this plurality of data buffers comprises a plurality of FIFOs The HAMER facility is described in pending application having Ser. No. 10/715,266, assigned to the common assignee hereof, and hereby incorporated herein.

As those skilled in the art will appreciate, a FIFO comprises a memory array, such as for example RAM, with two independent ports—one write and one read port, or an array of flops or latches), and read and write indexes (pointers) to array elements. As a first-in-first-out function, the FIFO is a memory element with no visible addressing—the indexes are local. Usually there is empty and/or full indication that reflects the indexes indirectly.

Use of the HAMER facility 215 permits sending trace data to multiple buffers by writing the data to a constant trace facility address associated with the targeted data buffer. HAMER does not store that trace data in the processor data cache. Rather, HAMER stores that trace data in the plurality of FIFOs. HAMER supports multiple trace buffers.

HAMER comprises functions, implemented by hardware, that manage microcode traces. HAMER includes 16 buffers disposed in a dedicated region of memory. Each buffer may be as small as 64 kilobytes and as large as 64 megabytes. The HAMER buffers are "read only" to all other devices, and can be written to only by the HAMER facility.

Associated with each HAMER buffer is a Trace Facility Address. Whenever microcode writes a trace entry to a HAMER buffer, that microcode must write the entry as a cache line entry to the appropriate Trace Facility Address and then flush the cache line. After the flush, the trace entry is put into the FIFO associated with the destination buffer.

Figure 5A:
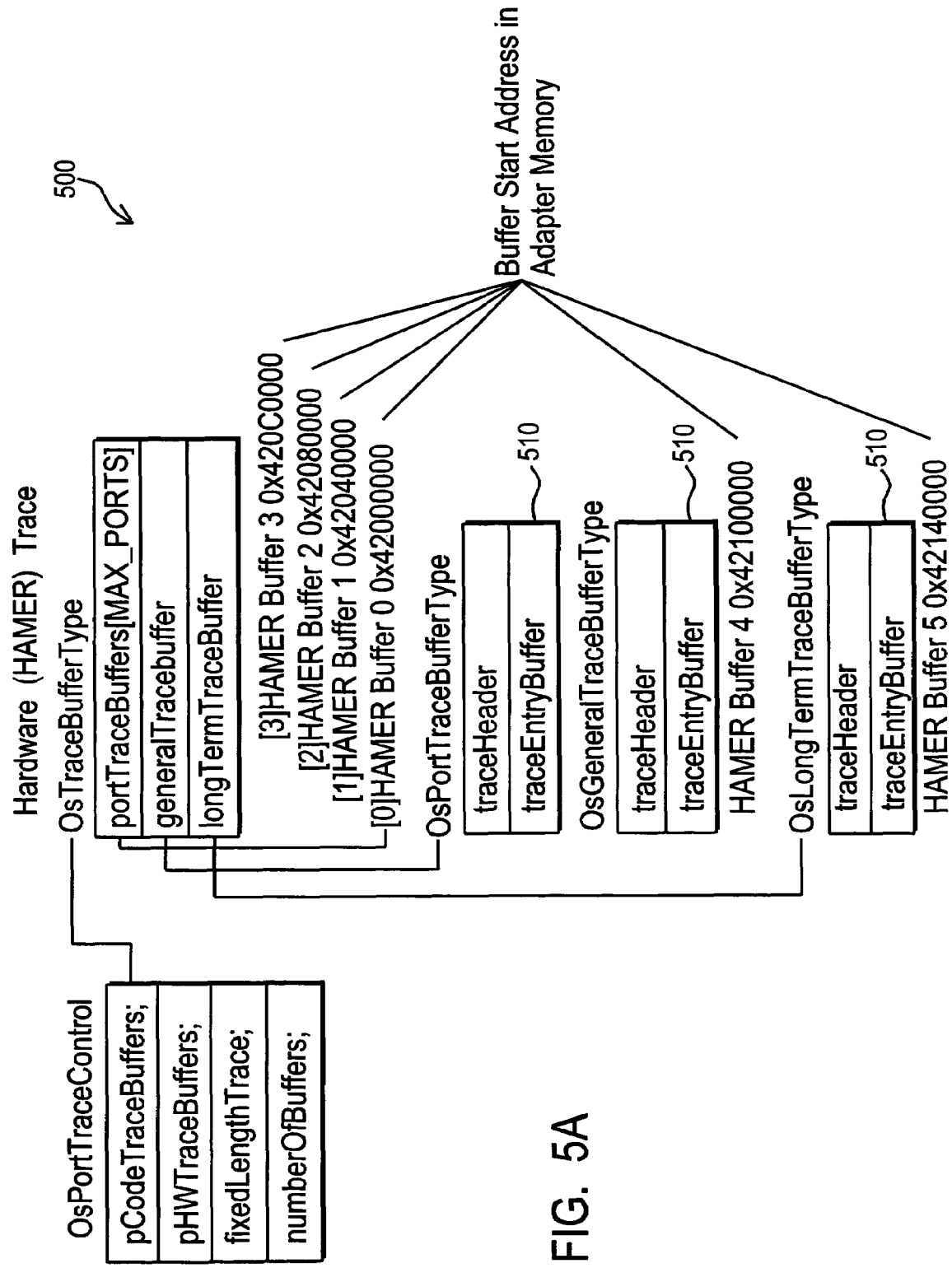
FIG. 5A shows the control structure used to implement Applicants' method.

Referring to FIGS. 5A and 5B, each HAMER buffer has a header which is 32 bytes in size and is the first entry flushed to HAMER by microcode. FIG. 5A shows the structure used to manage each of the HAMER buffers in memory.

In structure 500, there are 3 types of buffers, namely Port, General, and Long Term. Each type uses an instance of a traceHeader 505 (FIG. 5B) coupled with a traceEntryBuffer 510 (FIG. 5A).

The OsTraceBuffersType structure holds all 3 types of buffers. HAMER defines the traceHeader 505 as the first 32 bytes of each HAMER buffer. With the exception of the first two words, the remaining 6 words include data that aids in the formatting of the trace entries in the buffer for analysis. Each Port buffer instance of the traceEntryBuffer is stored in an array. The General and Long term trace buffers are disposed at the end of the Port buffers.

The osPortTraceControl structure maintains the HAMER buffers. This osPortTraceControl structure includes a pointer to the HAMER buffer location in-the memory, and a pointer to another set of trace buffers to be used by a software version of the trace function.. This osPortTraceControl structure also includes a flag that will indicate if the trace is fixed length. If the flag is negative, or false, or "0", then the trace format comprises a variable length trace entry.

In the illustrated embodiment of FIG. 2, embedded device 200 is capable of communicating with 4 host adapter ports, namely ports 260, 270, 280, and 290. In certain embodiments, ports 260, 270, 280, and 290, are disposed on embedded device 200. In other embodiments, ports 260, 270, 280, and 290, are external to embedded device 200.

Host adapter port 260 communicates with one or more host computers via communication link 264 and communicates with control chip 210 via communication link 262. Host adapter port 270 communicates with one or more host computers via communication link 274 and communicates with control chip 210 via communication link 272. Host adapter port 280 communicates with one or more host computers via communication link 284 and communicates with control chip 210 via communication link 282. Host adapter port 290 communicates with one or more host computers via communication link 294 and communicates with control chip 210 via communication link 292.

In certain embodiments, Applicants' method configures 6 trace buffers. Four of those trace buffers are each assigned to one of the host adapter ports. A fifth buffer is assigned to general traces. Traces sent to this buffer do not apply to any single adapter port. Trace entries are directed to the general buffer when no port context is defined, or when the user specifically calls the general trace macro. A sixth buffer is defined for long term trace events. The user must call this macro specifically.

HAMER maintains the trace buffers in adapter memory 250, including placing data in the buffer, updating the next entry pointer and handling buffer wrap from the last trace entry back to the first trace entry in the buffer. Applicants' method implements a variable length trace format. Each trace entry comprises at least 3 words and up to as many as 8 words of data.

Figure 3:
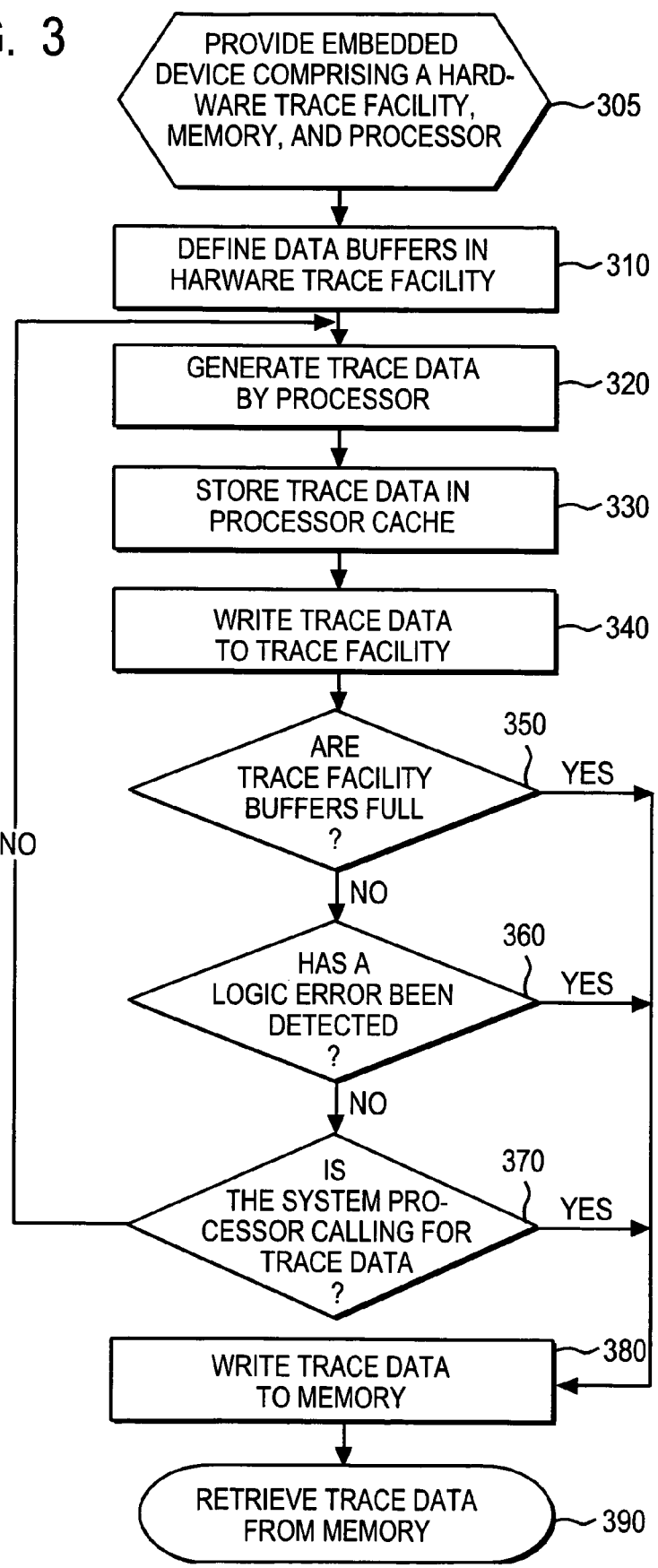
FIG. 3 is a flow chart summarizing the steps of Applicants' method to capture run time data.

FIG. 3 summarizes the steps of Applicants' method. In step 305, Applicants' method provides an embedded device, such as adapter card 200 (FIG. 2) which includes a hardware trace facility, such as the HAMER facility, memory, such as memory 250, and processor such as processor 230.

In step 310, Applicants' method defines data buffers in the hardware trace facility, such as trace facility 215. In certain embodiments, step 310 is performed at device initialization. In certain embodiments, step 310 includes defining a plurality of trace buffers. In certain embodiments, step 310 includes defining 6 trace buffers. A first trace buffer is associated with a first host adapter port and comprises about 128 KB. A second trace buffer is associated with a second host adapter port and comprises about 128 KB. A third trace buffer is associated with a third host adapter port and comprises about 128 KB. A fourth trace buffer is associated with a fourth host adapter port and comprises about 128 KB. A fifth trace buffer is associated with general trace entries and comprises about 64 KB. A sixth trace buffer is associated long term trace entries and comprises about 64 KB.

In step 320, processor 230 (FIG. 2) generates trace data as that processor uses microcode 255 (FIG. 2) to operate the embedded device, such as for example adapter card 200 (FIG. 2). FIG. 4 shows the format of each trace entry. Each trace entry includes at least the first three words 410, 420, and 430. Any trace entry may include up to 8 words.

Bytes 0 and 3 comprise a searchable pattern to distinguish the next trace entry. Bytes 4 and 5 comprise the lower 16 bits of the TBU, or Time Base Upper. Bytes 6 and 7 comprise an event ID used to describe the trace entry and the associated trace data words stored in the $4^{th}$ through $8^{th}$ words. The third word, i.e. word 420, comprises the TBL, or Time Base Lower. Time stamp information is read from the processor using one assembly instruction for the TBU and the TBL.

In step 330, Applicants' method stores the trace data of step 320 in processor cache 240 (FIG. 2). Step 330 further includes calling an assembly function comprising a PowerPC data control block set ("dcbz") instruction that clears a cache line for trace facility address. Step 330 further includes writing one trace line to the processor cache line thus avoiding a read from the trace buffer or from the trace facility address. Step 330 further includes building metadata for that trace entry and adding any data parameters to that trace entry.

In step 340, Applicants' method writes-the trace data from processor cache 240 to the trace facility 215 (FIG. 2). For port specific tracing, the current port context is used to obtain the port buffer's 32 bit trace facility address. Step 340 further includes calling another assembly function comprising a PowerPC data cache block flush instruction that writes the entire 32 byte trace entry to the trace facility.

In step 350, Applicants' method determines if one or more of the trace facility buffers are full. If Applicants' method determines that one or more of the trace facility buffers are full, then the method transitions from step 350 to step 380 wherein the method writes the trace data from one or more of the trace facility buffers to memory 250, using the flush instruction to the HAMMER hardware.

Alternatively, if Applicants' method determines in step 350 that none of the trace facility buffers are full, then the method transitions from step 350 to step 360 wherein the method determines if microcode 235 has detected a logic error. If Applicants' method determines in step 360 that the device microcode has detected a logic error, then the method transitions from step 360 to step 380 wherein the method writes the trace data from all the trace buffers to memory 250 using the flush instruction to the HAMMER hardware. In FIG. 3, step 360 is shown disposed between steps 350 and 370. Using Applicants' method, any time the device microcode 335 detects a logic error, Applicants' method writes the trace data from the trace data buffers to the device memory.

Alternatively, if Applicants' method determines in step 360 that the device microcode has not detected a logic error, then the method transitions from step 360 to step 370 wherein the method determines if a system processor, such as processor 132 (FIG. 1) and/or 142 (FIG. 1), is calling for trace data to be written to memory. If Applicants' method determines in step 370 that a system processor is calling for trace data to be written to memory, then the method transitions from step 370 to step 380 wherein the method writes the trace data from all the trace buffers to memory 250, using the flush instruction to the HAMMER hardware.

In FIG. 3, step 370 is shown disposed between steps 360 and 380. Using Applicants' method, any time the system processor calls for trace data to be written to memory, Applicants' method writes the trace data from the trace data buffers to the device memory.

If Applicants' method determines in steps 350, 360, and 370, that none of the trace facility buffers are full, that the device microcode has not detected a logic error, and that the system processor is not calling for trace data to be written from the trace facility buffers to memory, then the method transitions from step 370 to step 320 and continues as described herein.

Applicants' method transitions from step 380 to step 390 wherein the trace data is retrieved from memory. Using Applicants' apparatus and method, the trace data can be retrieved from memory even if, for any reason, the embedded device, such as for example adapter card 200, has been reset.

In certain embodiments, individual steps recited in FIG. 3 may be combined, eliminated, or reordered.

In certain embodiments, Applicants' invention includes instructions residing in memory 250 (FIG. 2) where those instructions are executed by processor 230 (FIG. 2) and/or HAMER utility 215 to performs steps 320, 330, 340, 350, 360, 370, 380, and/or 390, recited in FIG. 3.

In other embodiments, Applicants' invention includes instructions residing in any other computer program product, where those instructions are executed by a computer external to, or internal to, system 100, to perform steps 320, 330, 340, 350, 360, 370, 380, and/or 390, recited in FIG. 3. In either case, the instructions may be encoded in an information storage medium comprising, for example, a magnetic information storage medium, an optical information storage medium, an electronic information storage medium, and the like. By "electronic storage medium," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to generate and save run time data, comprising the steps of:
   supplying an embedded device comprising a processor, a processor cache, memory, a hardware trace facility comprising a plurality of data buffers, a first bus interconnecting said hardware trace facility and said memory, and a second bus interconnecting said processor and said hardware trace facility, wherein said embedded device is capable of communicating with one or more host adapter ports;
   generating trace data by said processor, without interrupting said first bus or said second bus;
   storing said trace data in said processor cache, without interrupting said first bus or said second bus;
   writing said trace data to said plurality of data buffers comprising a plurality of FIFOs, without interrupting said first bus;
   issuing a data cache block set command to allocate a cache line;
   writing one trace line per processor cache line.

2. The method of claim 1, wherein said trace line includes at least 3 and up to 8 words of data.

3. The method of claim 1, further comprising the steps of:
   providing a hardware trace facility comprising a plurality of FIFOs;
   wherein said writing trace data to said plurality of data buffers step further comprises:
   issuing a data cache block flush command;
   writing up to the size of the cache line of data from said cache line to said plurality of FIFOs.

4. The method of claim 1, wherein said embedded device is capable of communicating with (N) host adapter ports, wherein (N) is one or more.

5. The method of claim 4, further comprising the steps of:
   defining (N) data buffers, wherein each of said (N) data buffers is associated with a different one of said (N) host adapter ports;
   defining an (N+1)th data buffer to hold trace data relating to long term trace data; and
   defining an (N+2)th data buffer to hold trace data relating to common events not associated with a specific host adapter port.

6. An article of manufacture comprising a processor, a processor cache, memory, a hardware trace facility comprising a plurality of FIFO data buffers, a first bus interconnecting said hardware trace facility and said memory, and a second bus interconnecting said processor and said hardware trace facility, wherein said article of manufacture is capable of communicating with one or more host adapter ports, and a computer useable medium having computer readable program code disposed therein to generate and save run time data, the computer readable program code comprising a series of computer readable program steps to effect:
   generating trace data, without interrupting said first bus or said second bus;
   storing said trace data in said processor cache, without interrupting said first bus or said second bus;
   writing said trace data to said plurality of FIFOs, without interrupting said first bus;
   issuing a data cache block set command to allocate a cache line;
   writing one trace line per processor cache line.

7. The article of manufacture of claim 6, wherein said trace line includes at least 3 and up to 8 words of data.

8. The article of manufacture of claim 6, wherein the computer readable program code to write trace data to said plurality of FIFOs step further comprises a series of computer readable program steps to effect:
   issuing a data cache block flush command;
   writing up to the size of the cache line of data from said cache line to said plurality of FIFOs.

9. A computer program product encoded in an information storage medium and usable with a programmable computer processor to generate and save run time data using an embedded device comprising a processor, a processor cache, memory, a hardware trace facility comprising a plurality of FIFO data buffers, a first bus interconnecting said hardware trace facility and said memory, and a second bus interconnecting said processor and said hardware trace facility, wherein said embedded device is capable of communicating with one or more host adapter ports, comprising:
   computer readable program code which causes said programmable computer processor to generate trace data by said processor, without interrupting said first bus or said second bus;
   computer readable program code which causes said programmable computer processor to store said trace data in said processor cache, without interrupting said first bus or said second bus;
   computer readable program code which causes said programmable computer processor to write said trace data to said plurality of FIFOs, without interrupting said first bus;
   computer readable program code which causes said programmable computer processor to issue a data cache block set command to allocate a cache line;
   computer readable program code which causes said programmable computer processor to write one trace line per processor cache line.

10. The computer program product of claim 9, wherein said trace line includes at least 3 and up to 8 words of data.

11. The computer program product of claim 10, wherein the computer readable program code which causes said programmable computer processor to write trace data to said plurality of data buffers step further comprises computer readable program code which causes said programmable computer processor to:
   issue a data cache block flush command;
   write up to the size of the cache line of data from said cache line to said plurality of FIFOs.

* * * * *